A. R. PRITCHARD.
BAIL BEARING FOR LANTERNS.
APPLICATION FILED JAN. 23, 1911.

990,389.

Patented Apr. 25, 1911.

Witnesses:
C. W. Carroll
L. Thow

Inventor:
Albert R. Pritchard
by his attorneys
Osgood, Davis & Dorsey

UNITED STATES PATENT OFFICE.

ALBERT R. PRITCHARD, OF ROCHESTER, NEW YORK.

BAIL-BEARING FOR LANTERNS.

990,389.  Specification of Letters Patent.  Patented Apr. 25, 1911.

Application filed January 23, 1911. Serial No. 604,291.

*To all whom it may concern:*

Be it known that I, ALBERT R. PRITCHARD, a citizen of the United States, and resident of Rochester, in the county of Monroe and State of New York, have invented certain new and useful Improvements in Bail-Bearings for Lanterns, of which the following is a specification.

This invention relates to the bearing by which the end of the bail or handle is pivoted to the air-tube in a tubular lantern.

The object of the invention is to produce a durable bail-bearing of simple and inexpensive construction, which shall have provision for retaining the bail in upright position ready for convenient use.

To this end the invention consists in the bail-bearing hereinafter described, as it is defined in the succeeding claims.

Figure 1:
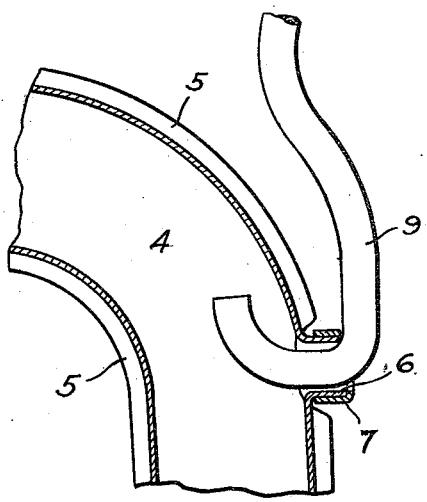
Figure 2:
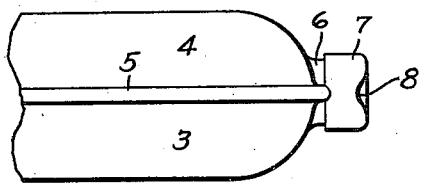

In the drawings:—Figure 1 is a vertical section of a bail-bearing embodying the present invention, on an enlarged scale, the figure showing also a portion of the air-tube and of the bail in connection with which the bearing is used; and Fig. 2 is a plan-view of the bail-bearing and the adjacent portion of the air-tube.

As the invention is applicable to tubular lanterns of ordinary form the drawings show only a small portion of the lantern, including a part of one of the air-tubes and one end of the bail. The air-tube may be formed of sheet metal in any ordinary or suitable manner, but is illustrated as comprising two drawn sheet-metal members 3 and 4 united by the usual seams 5.

It has heretofore been common to produce a bail-bearing in an air-tube by perforating the latter and forcing the sheet metal outwardly at the perforation in the form of a short nipple. In such bearings, as ordinarily constructed, however, there is no additional thickness of metal to resist the wear or strain of the bail against the air-tube, and the bearing is liable to become enlarged so that the bail may become accidentally disengaged therefrom. Furthermore, there is no provision in the bearing itself, as ordinarily constructed, for maintaining the bail in upright position when desired, and supplementary abutments or devices have to be provided for this purpose upon the bail or the air-tube.

In the present construction I employ an outwardly-extending nipple 6 at the bail-bearing, but make this nipple somewhat longer than usual and reinforce it by soldering upon it a sleeve or thimble 7 which preferably fits closely upon the nipple. In place of soldering the thimble upon the nipple it may be made a tight fit and forced thereon so as to be retained by friction alone. In either case it reinforces the nipple and increases the thickness of metal at this point in such a manner as to produce a bearing which cannot readily be enlarged by the wear and strain of use. The thimble may be a plain length of tubing, but I prefer the form shown in the drawings, in which the thimble is drawn from sheet metal and has a slight inwardly-projecting flange 10 at its outer edge, which incloses the outer edge of the nipple and produces a smooth finished appearance.

As a provision for the retention of the bail in upright position a recess 8, of rounded contour, is made in both the nipple and the thimble at the upper part thereof, and the bail 9, being of the usual resilient wire, springs into this recess when the bail is in upright position and is thereby retained in such position ready for convenient use. The thickening of the metal at the bearing, by the addition of the thimble, provides sufficient material to permit this construction without undue wear upon the surface which the bail frictionally engages, and thus a durable and effective bearing is produced with the use of very little metal additional to that of which the air-tube is formed.

I claim:—

1. In a tubular lantern, an air-tube having an integral outwardly-projecting substantially-cylindrical nipple, an annular reinforcing-sleeve surrounding and fixed to the nipple, and a resilient wire bail having an end pivoted in the nipple, and bearing upon the inner surface thereof, the upper edge of the nipple and the reinforcement being recessed to produce a detent-socket to hold the bail in upright position.

2. In a tubular lantern, an air-tube having an integral outwardly-projecting nipple, a reinforcing thimble fixed upon the outer surface of the nipple and having a margin bent inwardly to cover the end of the nipple, and a resilient wire bail having an end pivoted in the nipple and bearing upon the inner surface thereof, the upper edge of the nipple and the thimble being recessed to produce a detent-socket to hold the bail in upright position.

ALBERT R. PRITCHARD.

Witnesses:
CLAUDE S. S. SMITH,
FARNUM F. DORSEY.

Copies of this patent may be obtained for five cents each, by addressing the "Commissioner of Patents, Washington, D. C."